United States Patent [19]
Cumming

[11] 3,772,549
[45] Nov. 13, 1973

[54] WHEEL SPEED SENSOR
[75] Inventor: James C. Cumming, Pleasant Ridge, Mich.
[73] Assignee: Rockwell International Corporation, Pittsburgh, Pa.
[22] Filed: May 2, 1972
[21] Appl. No.: 249,659

[52] U.S. Cl. .................................................. 310/168
[51] Int. Cl. .......................................... H02k 19/24
[58] Field of Search ...................... 310/168, 68, 67, 310/154, 155

[56] References Cited
UNITED STATES PATENTS
3,482,129    12/1969    Riordan ........................... 310/168 X
3,500,091    3/1970    Jones .................................. 310/168

Primary Examiner—D. F. Duggan
Attorney—John R. Bronaugh et al.

[57] ABSTRACT

A system for mounting a wheel speed sensor mechanism including a magnetic sensor and a rotor on a vehicle axle and wheel to assure disposition of the sensor and rotor in precisely predetermined relation during operation and upon initial installation and reinstallation of the wheel.

4 Claims, 4 Drawing Figures

WHEEL SPEED SENSOR

BACKGROUND OF THE INVENTION

Most modern anti-skid control systems function in response to electrical signals indicative of the angular velocity of one or more of the vehicle wheels. Generally these signals are derived from an electromagnetic sensor including a magnet carried by a stationary portion of the vehicle such as the axle housing, and a toothed or notched ring rotatable with the wheel opposite the magnet. As the teeth or notches of the ring pass the magnetic sensor device the resulting variations in flux generate a signal, the frequency of which is a function of the angular velocity of the wheel.

To produce the required accuracy of the velocity signal the sensor and ring must be precisely located with respect to each other and must remain in a preselected relationship even after extended operation in which the components are subjected to road shocks and constant vibration. Further, the continued effectiveness of the velocity sensing unit requires that it be fully protected against dirt, mechanical damage and heat.

It is also essential that installation techniques be adaptable to mass production methods and minimize the requirement for highly skilled technicians and elaborate installation techniques. The mounting of the sensor units must also be such that upon reinstallation of a wheel after removal for repair, the parts will automatically be restored to their original operating position.

Prior proposals for mounting the velocity sensor elements have in general failed to satisfy one or more of these criteria and in general have achieved a degree of accuracy only at a substantial cost penalty.

SUMMARY OF THE INVENTION

It is the principal purpose and object of the present invention to provide improved systems for mounting vehicle wheel speed sensor devices of the type described, the mounting system assuring that the rotating and stationary components of the sensor device will be positioned in precisely predetermined relationship at initial installation and upon reinstallation of the wheel and will remain in proper operating relationship throughout an extended period of service.

It is a further object of the present invention to provide improved systems for mounting wheel speed sensor devices which facilitate low cost rapid installation of the sensor components and which assure that the sensor components will be maintained in proper relationship automatically upon removal and reinstallation of the wheel.

It is also an object of the present invention to provide improved systems for mounting wheel speed sensors which protect the sensor components from dirt and other foreign matter and from mechanical damage and heat.

Additional objects and advantages will become apparent as the description proceeds in connection with accompanying drawings.

In attaining these objects and other objects the present invention provides a pair of accurately formed annular mounting surfaces, one on the axle and one on the wheel hub, the annular mounting surfaces being disposed in precisely predetermined relation when the wheel hub is installed on the axle.

The rotating and stationary components of the sensor mechanism are assembled to the annular mounting surfaces on the axle and wheel hub, respectively, prior to assembly of the wheel hub on the axle. The sensor components are preferably installed with a press fit to assure their accurate radial location and to locate them in planes perpendicular to the axis of the wheel hub. They are located in the proper relative axial position by reference to further accurately formed radial surfaces on the wheel hub and axle, respectively.

THE DRAWINGS

DESCRIPTION OF THE PREFERRED EMBODIMENTS

Figure 1:
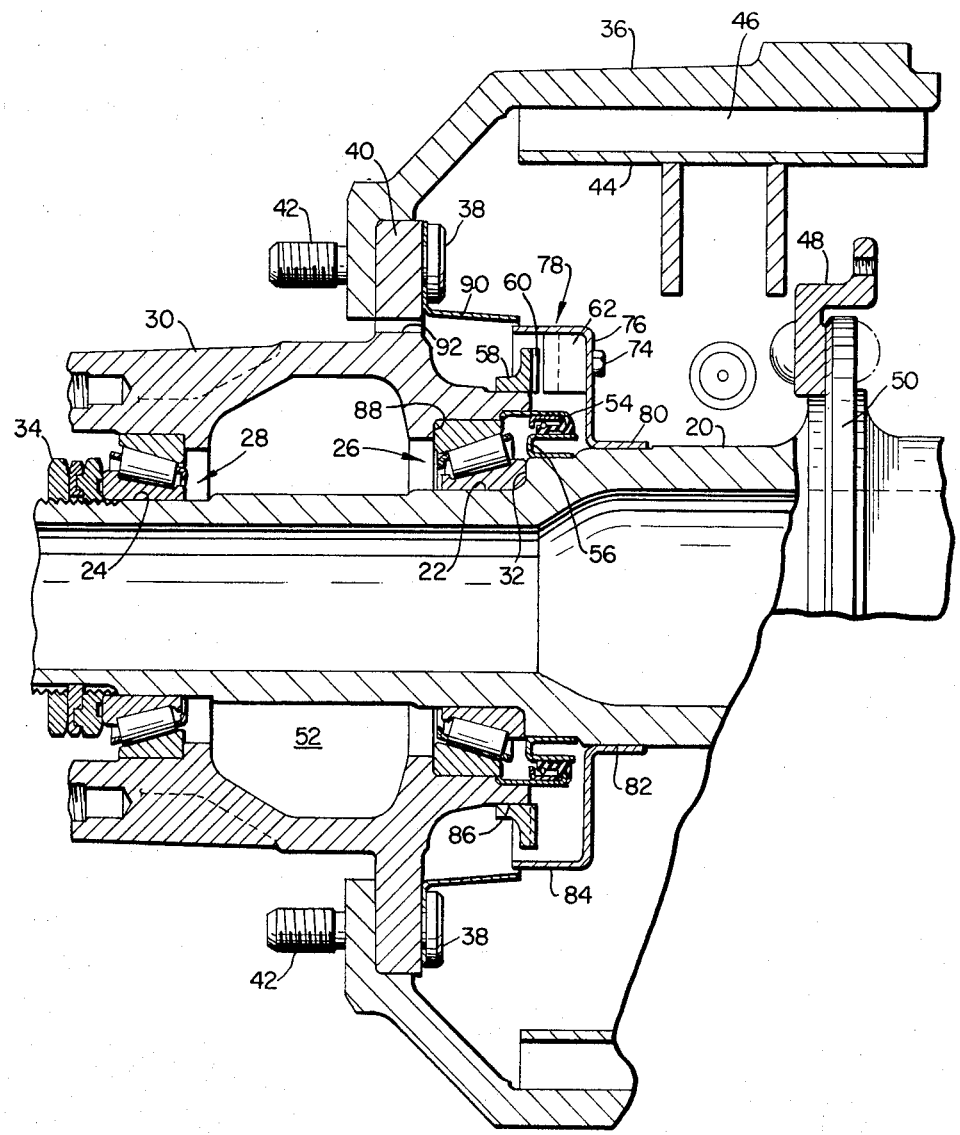
FIG. 1 is a fragmentary section showing a typical wheel speed sensor mounting system in accordance with the present invention.

For present purposes the invention will be disclosed as applied to a non-steerable vehicle axle, particularly an axle designed for heavy duty use, such as a rear axle of a truck. As used herein the term "axle" is intended to refer to any component on which a wheel hub is mounted and includes components sometimes called spindles or axle housings.

Typically, the axle 20 is of hollow tubular construction to accommodate an axle shaft which may be installed if the wheels are to be driven. At its outer end the axle 20 is provided with a pair of bearing seats 22 and 24 for inner and outer bearing assemblies 26 and 28 upon which the wheel hub 30 is supported. Upon installation of the wheel hub the inner bearing 26 is moved into position against an accurately located radial shoulder 32 on the axle 20 and the parts are locked in this position by a lock nut assembly 34 threaded onto the outer end of the axle 20 and bearing against the inner race of the outer bearing assembly 28 to impart a predetermined preload to the two bearing assemblies 26 and 28.

The brake drum 36 is secured by a plurality of bolts 38 to a radial flange 40 on the wheel hub 30, the flange also carrying a plurality of wheel mounting studs 42 circumferentially spaced from the bolts 38. The brake assembly, which is conventional, includes brake shoes 44 carrying linings 46 and a brake operating mechanism, not shown, carried by a spider or backing plate, a portion of which is shown at 48 mounted on a radial flange 50 formed integrally with the axle 20.

Lubricant for the bearing assemblies 26 and 28 is carried in a cavity 52, the outer end of which is sealed by means not shown, the inner end of which is sealed by seal members 54 and 56 carried by the wheel hub and axle, respectively. The structure thus far described in conventional and per se forms no part of the present invention.

The wheel speed sensor assembly comprises two principal components, steel ring 58 carried by the wheel hub 30, the ring having a plurality of equally circumferentially spaced notches or teeth 60 on its inboard face and the second element being a magnetic sensor unit 62 carried by the axle 20.

In a typical case the ring 58 will have an O.D. of 8.5 inches and will be provided with 100 equally spaced teeth 60 having a radial length of approximately 0.75 inches and a depth of approximately 0.125 inches.

Figure 3:
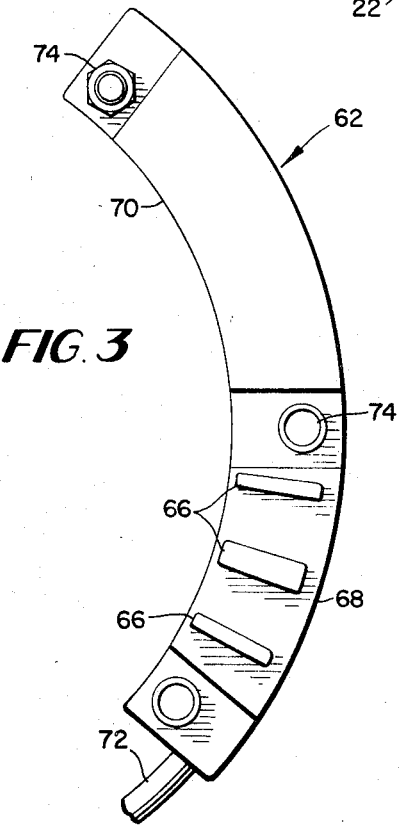
FIG.3 is a plan view of one of the sensor components removed from the assembly.
Figure 4:
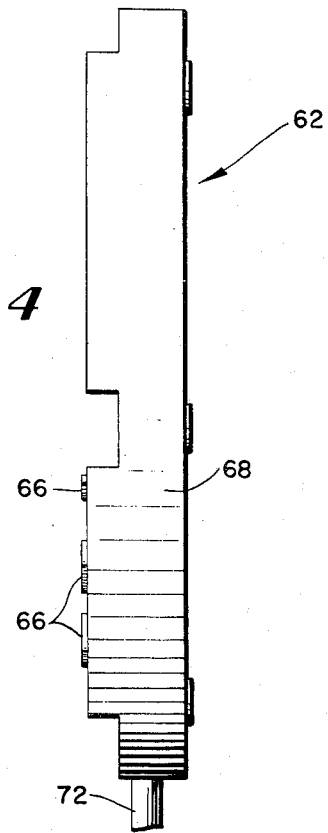
FIG. 4 is a side elevation of the components shown in FIG. 3.

The magnetic sensor unit 62, shown separately in FIGS. 3 and 4, is of arcuate configuration being formed on the same radius as the ring member 58 and in a typical case having a radial width of approximately 1 inch. The unit comprises a magnet assembly which may be of the E-core type having three exposed poles 66 suitably mounted in a plastic body portion 68 and a second portion 70 containing electric components (not shown) which convert to signals generated by the magnet to the proper form for use in the brake control system. The leads to the power supply for the sensor unit 62 as well as for the output signal are contained in the cable 72 leading into one end of the unit.

Proper operation of the sensor unit 62 can be obtained only if it is precise located with respect to the ring 58. The sensor 62 and the ring 58 must be essentially concentric. More important, the gap between the face of the ring 58 and the poles 66 must be held within close limits as the ring 58 rotates. To avoid runout or variations in gap width in operation, the axis of rotation of the ring 58 must be substantially exactly perpendicular to the plane containing the end faces of the pole pieces 66.

The present invention accomplishes this objective in the following manner. The sensor assembly 62 is secured by three bolts 74 to a radially extending portion 76 of an annular mounting member 78. The mounting member 78 is also provided with an axially extending cylindrical mounting portion 80 press fitted onto a mounting surface 82 on the axle 20 which is accurately machined to make it concentric with the machined bearing seats 22 and 24 for the wheel hub 30. The mounting member 78 also has a cylindrical shield portion 84 surrounding the outer surface of the sensor assembly 62 and the ring 58 and performing the dual function of protecting the components against the entry of dirt and foreign objects and shielding the sensor assembly 62 from the heat generated during application of the brakes.

The sensor unit 62 is installed by first bolting it to the mounting member 78. This sub-assembly is then press fitted onto the axle mounting surface 82. Preferably the installation of the mounting member 78 is effected with a tool which has one radial surface adapted to bear against the inner face of the radial portion 76 of the member 78 and a second radial face adapted to rear against the shoulder 32 when the mounting member 78 reaches the proper axial position.

Similarly, the member 58 is press fitted onto an annular mounting surface 86 formed on the wheel hub 30, the surface 86 being machined to render it concentric with the axis of the hub 30. Preferably the ring 58 is installed by the use of a tool having a first radial face adapted to engage the ends of the teeth 60 and a second radial face adapted to engage the annular shoulder 88 which locates the outer race of bearing assembly 26.

When the wheel hub 30 is subsequently installed on the axle as shown in FIG. 1 and the nut assembly 34 is tightened to preload the precision bearings 26 and 28, the ring 58 and sensor assembly 62 will be automatically disposed in proper relationship which in a typical case provides a gap of 0.040 inches between the faces of the teeth 60 on the ring 58 and the faces of the pole pieces 66 on the sensor unit 62. Problems of runout, that is, variations in gap width as the ring 58 rotates are virtually eliminated.

The mounting member 78 effectively shields the sensor unit 62 against heat and mechanical damage, the latter function being augmented by the slinger ring 90 secured to the wheel hub flange 40. The slinger ring also directs excess oil which may leak past the seal 56 to one or more drain openings 92 extending through the flange 40.

Removal and replacement of the wheel hub 30 may be effected using only techniques normally associated with such an operation. Upon reinstallation of the wheel hub the ring 58 and the sensor 62 will be automatically correctly repositioned.

Figure 2:
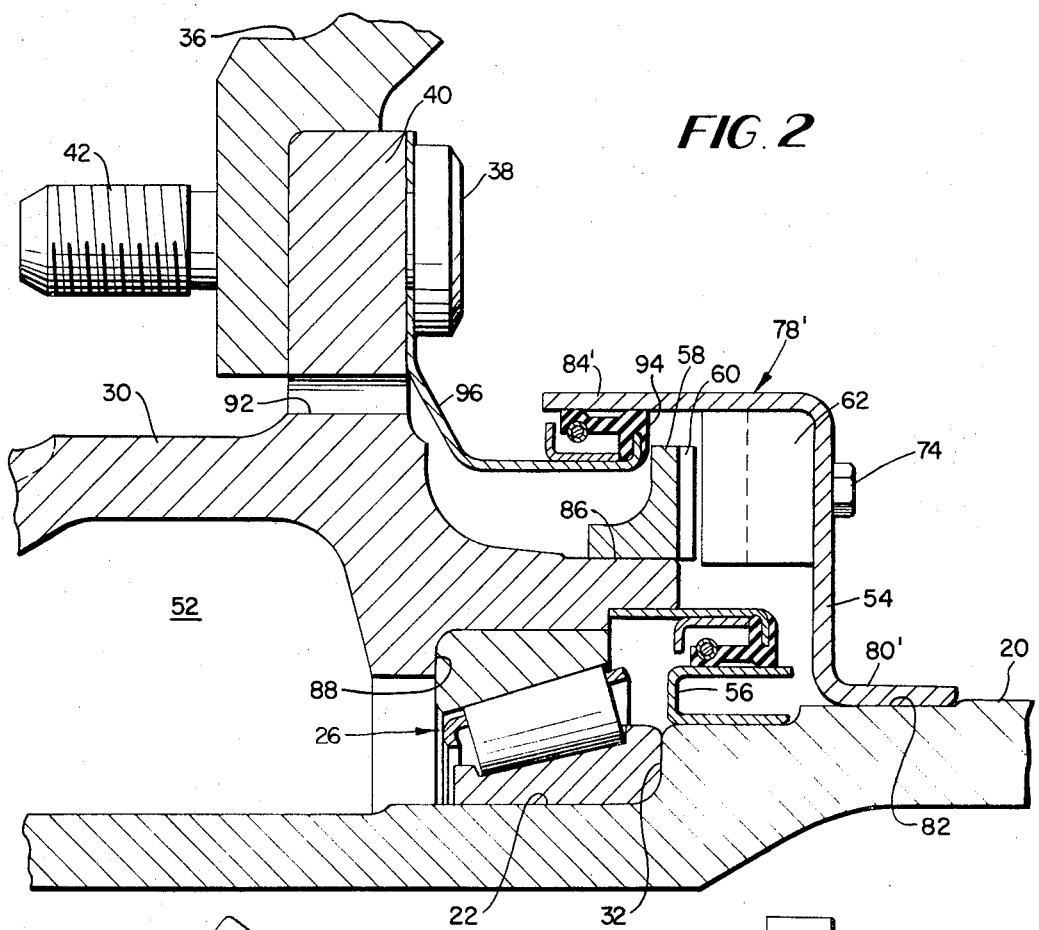
FIG. 2 is a slightly enlarged fragmentary view showing a modified wheel speed sensor mounting system.

The modification shown in FIG. 2 is essentially the same as that shown in FIG. 1 except that the outer annular portion 84' of the sensor support member 78' is axially extended in an outboard direction and carries a seal member 94 cooperating with a slinger ring 90 to further seal the space in which the ring and the sensor element operate and protect these elements from mechanical damage.

I claim:

1. In combination with an elongate vehicle axle and a wheel rotatably mounted on said axle, a wheel speed sensor assembly comprising a ring member having discontinuities on a radial face thereof, said ring member being secured by a press fit about a portion of said wheel for rotation therewith with said discontinuities facing axially inwardly, a magnetic sensor assembly, a mounting member for said sensor assembly, said mounting member having an axially outwardly facing radial face supporting said sensor assembly and an axially extending annular portion secured by a press fit onto said axle, said sensor assembly and said ring being disposed in a predetermined relation with a predetermined spacing betwen said sensor and said discontinuities on said ring.

2. The assembly according to claim 1, together with a stationary shield rigid with said mounting member and extending around the radially outer surface of said sensor assembly.

3. The assembly according to claim 2 together with an annular shield adapted to be carried by said wheel and extending axially into overlapping relation with said stationary shield.

4. The assembly according to claim 3, together with a seal extending between the overlapping portions of said annular shield and said stationary shield.

* * * * *